(12) United States Patent
Bartkowiak et al.

(10) Patent No.: US 7,611,753 B2
(45) Date of Patent: Nov. 3, 2009

(54) PROCESS FOR IMPREGNATING POROUS MINERAL SUBSTRATES

(75) Inventors: Bernd Bartkowiak, Wehr-Oeflingen (DE); Kerstin Weissenbach, Bad Saeckingen (DE); Nadja Kempkes, Rheinfelden (DE); Burkhard Standke, Loerrach (DE)

(73) Assignee: Degussa AG, Duesseldorf (DE)

( * ) Notice: Subject to any disclaimer, the term of this patent is extended or adjusted under 35 U.S.C. 154(b) by 1096 days.

(21) Appl. No.: 10/422,966

(22) Filed: Apr. 25, 2003

(65) Prior Publication Data

US 2003/0203117 A1    Oct. 30, 2003

(30) Foreign Application Priority Data

Apr. 26, 2002 (DE) .............................. 102 18 871.8

(51) Int. Cl.
B05D 1/02 (2006.01)
(52) U.S. Cl. .................. 427/393.6; 427/387; 427/421.1; 427/426; 427/427.2; 427/427.3; 427/427.4; 239/337; 239/338; 239/373; 239/398; 239/428.5
(58) Field of Classification Search .................. 427/387, 427/140, 393.6, 421
See application file for complete search history.

(56) References Cited

U.S. PATENT DOCUMENTS

| | | | | | |
|---|---|---|---|---|---|
| 2,557,593 | A | * | 6/1951 | Bjorkman | 239/528 |
| 2,656,217 | A | * | 10/1953 | Roche | 239/345 |
| 2,880,940 | A | * | 4/1959 | Briggs | 239/415 |
| 3,796,376 | A | * | 3/1974 | Farnsteiner | 239/353 |
| 3,899,018 | A | * | 8/1975 | Koenig | 164/489 |
| 4,236,674 | A | * | 12/1980 | Dixon | 239/296 |
| 4,301,971 | A | * | 11/1981 | Cornelius et al. | 239/351 |
| 4,744,518 | A | * | 5/1988 | Toth | 239/297 |
| 4,759,502 | A | * | 7/1988 | Pomponi et al. | 239/8 |
| 5,050,804 | A | * | 9/1991 | Svendsen et al. | 239/296 |
| 5,110,684 | A | | 5/1992 | Cooper | |
| 5,392,992 | A | * | 2/1995 | Farnsteiner et al. | 239/296 |
| 5,413,808 | A | * | 5/1995 | Wyner | 427/140 |
| 5,565,032 | A | | 10/1996 | Wyner | |
| 5,629,400 | A | | 5/1997 | Standke et al. | |
| 5,679,147 | A | | 10/1997 | Standke et al. | |
| 5,799,875 | A | | 9/1998 | Weinstein et al. | |
| 5,808,125 | A | | 9/1998 | Standke et al. | |
| 5,849,942 | A | | 12/1998 | Standke et al. | |
| 5,863,509 | A | | 1/1999 | Standke et al. | |
| 5,885,341 | A | | 3/1999 | Standke et al. | |
| 6,054,601 | A | | 4/2000 | Standke et al. | |
| 6,133,466 | A | | 10/2000 | Edelmann et al. | |
| 6,176,918 | B1 | | 1/2001 | Glausch et al. | |
| 6,177,582 | B1 | | 1/2001 | Jenkner et al. | |
| 6,197,382 | B1 | | 3/2001 | Ornstein et al. | |
| 6,228,936 | B1 | | 5/2001 | Standke et al. | |
| 6,239,194 | B1 | | 5/2001 | Standke et al. | |
| 6,251,989 | B1 | | 6/2001 | Edelmann et al. | |
| 6,255,513 | B1 | | 7/2001 | Standke et al. | |
| 6,288,256 | B1 | | 9/2001 | Standke et al. | |
| 6,361,871 | B1 | | 3/2002 | Jenkner et al. | |
| 6,395,858 | B1 | | 5/2002 | Mack et al. | |
| 6,491,838 | B1 | * | 12/2002 | Standke et al. | 252/8.57 |
| 6,534,667 | B1 | | 3/2003 | Standke et al. | |
| 6,641,870 | B2 | * | 11/2003 | Bartkowiak et al. | 427/407.1 |
| 6,685,766 | B2 | * | 2/2004 | Standke et al. | 106/14.41 |

FOREIGN PATENT DOCUMENTS

| | | | |
|---|---|---|---|
| BE | 706876 | * | 1/1968 |
| DE | 1 471 299 | | 5/1969 |
| EP | 0 814 110 | | 12/1997 |
| EP | 1 101 787 | | 5/2001 |
| EP | 1 193 302 | | 4/2002 |
| EP | 1 205 481 | | 5/2002 |
| GB | 935380 | * | 8/1963 |
| JP | 03-000130 | * | 1/1991 |
| JP | 03-0400980 | * | 2/1991 |

OTHER PUBLICATIONS

Hata et al, Tosokogaku, 36(9), pp. 324-331, 2001, translation.*
Hata, Kogyo Toso, 166, pp. 67-72, 2000, translation.*
Translation of JP 07-164121, Jun. 1995.*
Master Builders Technologies, Imagination, No. 4, pp. 90-99, "Bautenzchutg und Instandsetzung, Teil 1: Partielle Instandsetzung und Oberflächenschutz", Jan. 2000.
6. Verabeitungshinweise für Dynasylan BHN und BSM 40%, pp. 1-3, Oct. 1995.
"Wackersilicone für Den Denkmalschutz", p. 6, Apr. 1975.
Dr. M. Roth, Bautenschutzmittel Sonderdruck, 2 pages, "Anstriche Und Imprägnierungen Auf Natursteinen", Mar. 2001.
3 pages, "Wackersilicone Bautenschzmittel", May 1981.
Bautenschutzmittel / Masonry Water Repellents Wacker Silicone, pp. 1-4, "Wacker BS SMK 1311", Mar. 2001.
Bautenschutzmittel / Masonry Water Repellents Wacker Silicone, pp. 1-3, "Wacker BS 1001", Mar. 2001.
Bautenschutzmittel / Masonry Water Repellents Wacker Silicone, pp. 1-3, "Wacker BS 1701", Mar. 2001.
Bautenschutzmittel / Masonry Water Repellents Wacker Silicone, pp. 1-4, "Wacker BS 290", Mar. 2001.
Bautenschutzmittel / Masonry Water Repellents Wacker Silicone, pp. 1-4, "Wacker BS Créme C", Mar. 2001.

(Continued)

Primary Examiner—Erma Cameron
(74) Attorney, Agent, or Firm—Oblon, Spivak, McClelland, Maier & Neustadt, L.L.P.

(57) ABSTRACT

A process is provided for impregnating porous mineral substrates by a spray technique in which use is made of a gas-supported spraying assembly to apply liquid impregnating agent in a controlled manner to the substrate surface, the amount consumed being markedly less than the amount consumed in a conventional method of application by a flow-coating process.

40 Claims, No Drawings

OTHER PUBLICATIONS

Bautenschutzmittel / Masonry Water Repellents Wacker Silicone, 2 pages, "Wacker BS 28", Mar. 2001.

Bautenschutzmittel / Masonry Water Repellents Wacker Silicone, 2 pages "Wacker BS 29", Mar. 2001.

R. Hager, Master Builders Technologies, Imagination, Bautenschutz Mit Hydrophobleren—Ein Beitrag Zum Erhalten Der Bausubstanz, pp. 15-17, No. 2, "Silicone Für Die Hydrophobierung", Mar. 1999.

Fuji Industrial Spray Equipment Ltd, 1 page, "The History of HVLP", Mar. 20, 2002.

U.S. Appl. No. 10/581,690, filed Jun. 6, 2006, Standke.
U.S. Appl. No. 11/815,391, filed Aug. 2, 2007, Standke et al.
U.S. Appl. No. 11/814,127, filed Jul. 17, 2007, Standke et al.
U.S. Appl. No. 11/572,555, filed Jan. 23, 2007, Just et al.
U.S. Appl. No. 11/572,691, filed Jan. 25, 2007, Edelmann et al.
U.S. Appl. No. 11/718,442, filed May 2, 2007, Standke.

* cited by examiner

PROCESS FOR IMPREGNATING POROUS MINERAL SUBSTRATES

BACKGROUND OF THE INVENTION

1. Field of the Invention

The present invention relates to a process for, and to the use of specific spray technology for, impregnating porous mineral substrates to provide water-repellency and, where appropriate, oil-repellency and, where appropriate, also dirt repellency and graffiti repellency, in particular for treating construction materials.

2. Discussion of the Background

It has long been known that porous mineral substrates, i.e. construction materials, such as fiber-filled concrete, concrete, sandstone, limestone, natural stone, artificial stone, glass wool items, mineral wool items, bricks, artificial stone, mortar, render, terracotta, ceramics, calcium silicate brick, fiber-filled concrete panels, and also mineral-fiber-filled panels, and cement- or clay-bound construction materials can be protected by applying hydrophobicizing impregnating agents to provide effective resistance to moisture penetration. There are a large number of liquid impregnating agents suitable for this purpose. There are commercially available products based on natural and synthetic waxes and oils; on metal soaps, such as stearates; on synthetic resins, such as acrylate resins, epoxy resins, alkyd resins, or polyurethane resins; or on silicon-based products, such as alkylalkoxysilanes, alkylalkoxysiloxanes, silicones, and also silicone resins. It is also possible to achieve oleophobic properties by using fluorinated products, e.g. Teflon, modified fluoroalkyl resins, fluoroalkylalkoxysilanes, fluoroalkylalkoxysiloxanes, fluoroalkylhydroxysiloxanes, or fluorosilicones.

The advantages of these processes for providing hydrophobic or oleophobic properties are described in the literature and are well known to the skilled worker. The methods for describing the effectiveness of processes for providing hydrophobic or oleophobic properties are likewise known from the literature. Examples which may be mentioned here are, for hydrophobicization, the penetration depth and the reduction in water absorption; and for oleophobic properties and anti-graffiti properties the functional test described in the set of regulations for "Bewertung von Verfahren, Technologien and Materialien zur Graffitientfemung und Graffitiprophylaxe" (Assessment of processes, technologies, and materials for graffiti removal and graffiti prevention) (ReGG) issued by the Gutegemeinschaft Antigraffiti, Copyright 2000 by Labor Dr. Kupfer, Alt Stralau 54, 10245 Berlin.

Liquid impregnating agents are generally applied to saturation by flow-coating processes, such as spreading, spraying, dipping, for example using a brush or roller, or using a Birchmeier spray, or using airless devices (Series of publications by MBT AG, Meynadier "Bautenschutz and Instandsetzung, Teil 1: Partielle Instandsetzung und Oberflachenschutz (Protection and repair of buildings, part 1: partial repair and surface protection), No. 4 January 2000, ISBN 3-907075-04-8, pp. 92, 95, and 98; "Verarbeitungshinweise fur DYNASYLAN® BHN and BSM 40%" (Usage instructions for DYNASYLANV BHN and BSM 40%), October 1995, Hüls A G; "WackerSilicone fur den Denkmalschutz" (Wacker silicones for protection of historic buildings), April 1975, p. 6; Dr. M. Roth in Bautenschutzmittel Sonderdruck "Anstriche und Impragnierungen auf Naturstein" (Paints and impregnating materials on natural stone), Wacker Chemie GmbH; "Wackersilicone Bautenschutzmittel" (Wacker silicones for protection of buildings), May 1981, p. 35 10; product information relating to Wacker BS® SMK 1311, Wacker BS® 1001, Wacker BS® 1701, Wacker BS® 290, Wacker BS® Creme C, Wacker BS® 28, Wacker BS® 29 (all dated March 2001)).

A disadvantage of these flow-coating processes is that the amount of liquid impregnating agent applied is always the amount which the construction material is capable of absorbing (cf., for example, series of publications by MBT, Meynadier Bautenschutz mit Hydrophobieren (Protection of buildings, using hydrophobicizing processes), No. 2, March 1999, R. Hager "Silicones for hydrophobicization", p. 16). In the case of highly absorbent substrates, therefore, additional dilution of the impregnating agent is necessary, in order to avoid excessive consumption of product and moreover to avoid severe local variations in the result of hydrophobicization.

For example, if an absorbent brick is treated by the flow-coating process, the consumption of product can be about 1 l/m$^2$ or more. If a concentrated, i.e. solvent-free, product is used in this way the result is unnecessarily high consumption of product, resulting in high costs and often also a performance disadvantage. For example, in instances where use is made of siloxane- and silicone-resin-based products, a tacky resin film which is esthetically unattractive is produced on the surface. In the case of substances with good penetration, for example monomeric alkyl-trialkoxysilanes or short-chain alkylalkoxy-siloxanes, a penetration depth of the order of centimeters results when such high amounts are applied to absorbent substrates. Since these active ingredients are expensive and a penetration depth in the region of about 1 cm is generally sufficient for the desired action, solvents are used to dilute the valuable active ingredients. In the case of emulsion systems water may be used, and in the case of solvent-based systems alcohols or petroleum hydrocarbons may be used. However, a disadvantage is that solvents pass into the atmosphere and, respectively, that some construction materials exhibit long drying times when water-based products are used, and this is particularly disadvantageous when fiber-filled concrete panels, for example, are hydrophobicized at the factory, since the production process includes an additional drying step.

In addition, multiple wet-on-wet application is usually recommended for liquid impregnating agents in order to achieve maximum uniformity of product application. For example, the Hüls brochure relating to the protection of buildings recommends under "Verarbeitungshinweise for DYNASYLAN® BHN and BSM 40%" (Usage instructions for DYNASYLAN® BHN and BSM 40%) that there should be a visible reflective liquid run-off curtain of length from 30 to 50 cm on vertical surfaces. Another way of achieving this effect on relatively small areas is to pour the material from a can onto the vertical surface. High-pressure misting of the impregnating liquid, for example as achieved by the airless technique, and also during Birchmeier spraying, should be avoided since firstly the aerosol droplets formed are hazardous to health and secondly considerable product losses can occur through evaporation and overspray. The airless technique generally uses nozzle internal pressures >2 bar. For example, in the painting industry the pressure range from 7 to 14 bar is usually used for the airless technique, producing very fine spray mists.

Absorbent substrates, such as some natural stones, e.g. Euville or Savonnieres, and also fiber-filled concrete components or mineral-fiber insulating boards, have such high porosity that the resultant material consumption here is of the order of kilograms per square meter, in particular if the recommended double flow-coating process is used. In order to control the active ingredient content in such cases, dilute solutions or dilute emulsions are used. This has the disadvantage that either it is necessary to use solvents or the active ingredients have to be processed by a complicated method to give water-dilutable emulsions.

When prefabricated components are impregnated in the factory, the use of solvents is particularly disadvantageous, since in the case of organic solvents the evaporation process can produce explosive mixtures with air, and when water is used as solvent (emulsions) long drying times have to be accepted. In addition, there are environmental disadvantages with the use of solvents in the hydrophobicization of, for example, existing facades.

The flow-coating process to saturation is also used in antigraffiti impregnation. An improved multistage process for antigraffiti impregnation is disclosed in EP 1 193 302. Here, the first application of the antigraffiti impregnating agent takes place from dilute solution in order to control consumption of product. Further applications take place using a device equivalent to a Birchmeier spray (Gloria sprayer, operating pressure 3 bar). A disadvantage here is that the first application of product takes place from dilute solution, causing increased manpower cost and relatively high drying times, and that from the second application pass the spray mists produced can pose problems, together with the need, apparently resulting from slightly non-uniform application of material, to carry out mechanical finishing. The result of this can be higher consumption of material and longer waiting times between application of the individual layers.

Use of the air-supported HVLP (high volume low pressure) and LVLP (low volume low pressure) spraying techniques for painting is known.

SUMMARY OF THE INVENTION

It was therefore an object to provide another method which is effective and at the same time maximizes cost-effectiveness for impregnating porous mineral substrates. It was particularly desirable to impregnate even markedly porous materials with maximum cost-effectiveness without diluting the active ingredient, and also to permit improved application of materials for antigraffiti impregnation.

The object set has been achieved according to the invention as stated in the patent claims.

The disclosures of EP 1 101 787, EP 1 193 302, EP 0 814 110, and EP 1 205 481 are incorporated by reference herein in their entireties.

Surprisingly, it has been found that the gas-supported spraying technique, the HVLP (high volume low pressure) or LVLP (low volume low pressure) technique can be used particularly advantageously for impregnating porous mineral substrates, in particular markedly porous construction materials, in order to give them hydrophobic, oleophobic, and/or dirt-repellent properties, since this technique can be used particularly cost-effectively while giving excellent impregnation results and high environmental compatibility, and also simple and reliable operation. When compared with a spraying technique not supported by air (airless process), the spraying assemblies operating with compressed air have the advantage in the application, in particular for construction material applications, of bringing about less "overspray". In the airless technique, in contrast, high levels of ricochet of the liquid droplets produce high levels of liquid flow-off, increasing consumption of material. The low atomization pressure in the present process, preferably less than 2 bar gauge, also leads to markedly less formation of spray mist. Surprisingly, as shown in the present examples, this also has a favorable effect on impregnation of porous materials. A particularly surprising fact is that when the gas-supported spray technique is used the use of solvents can substantially be dispensed with, and the pure active substances can be applied directly if they are liquid to highly viscous. Porous materials which in the flow-coating process absorb more than 100 ml of impregnating agent in a single pass of the operation have hitherto required the use of dilute impregnating agents. In particular when using substrates of this type, the present process permits the use of substantially undiluted liquid active impregnating ingredients. However, it is also possible to use dilute or emulsified active ingredient systems in the present process. Another, surprising advantage of the present process over airless techniques becomes apparent during antigraffiti impregnation using liquid active ingredients, for example as described in EP 1 101 787, improved application of these being described in EP 1 193 302. Using the technique of the invention, dilution of the impregnating solutions can be dispensed with for the first impregnation, thus saving material. Furthermore, the subsequent impregnations needed for satisfactory antigraffiti performance can be applied more uniformly and at lower cost. In addition, the waiting times between the impregnation steps are markedly shorter with the novel, improved technique.

The present invention therefore provides a process for impregnating porous, mineral substrates by a spraying technique, which comprises using a gas-supported spraying assembly, by means of which liquid impregnating agent is advantageously applied in a controlled manner to the surface of porous mineral substrates, the amount consumed being markedly less than the amount consumed during conventional methods of application by flow-coating processes.

DETAILED DESCRIPTION OF PREFERRED EMBODIMENTS

In carrying out the process of the invention it is preferable to use a gas-supported spraying assembly which is substantially composed of (i) a nozzle system, of (ii) a gas-compression unit, including a regulating unit for the gas pressure or for the amount of gas, and of (iii) a storage unit for a liquid impregnating agent and, where appropriate, including a liquid-conveying unit and liquid-regulating unit, there being a connection from (ii) to (i) for conveying gas, and a connection from (iii) to (i) for supplying the nozzle system with liquid.

Examples of air-supported spraying assemblies which may be used with advantage in the process of the invention are therefore those for what is known as the HVLP or LVLP technique (U.S. Pat. Nos. 5,799,875; 5,064,119; 4,744,518; 4,759,502; and 5,050,804), for example as supplied by the companies Sata, Optima, Devilbiss, Elektra Beckum, Elmag, Graco, and Walter Pilot.

The present invention therefore also provides the use of a gas-supported spraying assembly which is substantially composed of the units (i), (ii), and (iii) for impregnating porous mineral substrates with an impregnating agent which comprises a silicon compound as active ingredient, preferably for the protection of buildings, and in particular for antigraffiti applications.

Spray devices which have proven successful in the process of the invention are those which operate by way of a nozzle system where, unlike in the airless technique, compressed air is fed into the nozzle system. The nozzle system may be composed of one or more nozzles and, where appropriate, may also be guided automatically over the surface to be impregnated.

The nozzle internal pressure in the process of the invention is preferably less than 2 bar gauge, particularly preferably less than 1 bar gauge, and very particularly preferably less than 0.7 bar gauge, in order to eliminate very substantially undesired spray mists which generally lead to losses of product and can also constitute a risk to workplace safety.

In embodiments, the gas-supported spraying assembly comprises a nozzle system; the nozzle system comprises one or more nozzles; the liquid impregnating agent and the gas are fed into the nozzle system at a pressure of at most 2 bar gauge; and the gas atomizes the liquid impregnating agent in the nozzle system.

According to the invention, gas-supported spraying assemblies are operated with a pressure of from 0.05 to ≦2 bar above atmospheric pressure. Gases or gas mixtures other than air may be used here, for example noble gases, nitrogen, carbon dioxide, oxygen—to mention just a few.

For liquid impregnating agents in the viscosity range from 0.5 to 150,000 mPa·s, use is preferably made of spray nozzles whose diameter is less than 4 mm, particular preference being given to nozzle diameters of from 0.5 to 3.5 mm, and very particular preference being given to nozzle diameters of from 0.7 to 3 mm.

A suitable way of adjusting liquid throughput and air throughput is by way of different independent valves. It is particularly preferable to use a needle valve in the nozzle system to regulate the liquid flow. The air flow is preferably produced by a separate compressor. A suitable compressor has variable supply rate if there if no way of adjusting the air flow at the spray nozzle. If this possibility is available, use may also be made of compressors with constant supply rate. The supply rate per nozzle at atmospheric pressure and room temperature should be >100 l/min, preferably >1000 l/min, and particularly preferably >2500 l/min.

Impregnating substances which may be used in the process of the invention are any of the liquid hydrophobicizing and oleophobicizing agents known per se—including, as always, dilute solutions of silanes, of siloxanes, and of silicones, and also emulsions comprising silicon compounds.

However, it is particularly advantageous to use impregnating substances based on silicon, for example organofunctional silanes, siloxanes, silicones, silicone resins, or siliconates, in particular for a first application pass in the process of the invention. For other application passes, i.e. subsequent impregnations, during which a further spraying procedure follows the previous procedure, use may also be made of solutions based on silicon compounds in organic solvents or water, or of low- or high-viscosity aqueous emulsions of these (oil in water or else water in oil).

Monomeric silanes which are very particularly suitable as active ingredient or impregnating agent for use in the process of the invention are those of the general formula I $$R^1\!-\!Si(R^2)_a(OR^3)_{3-a} \qquad (I),$$

where $R^1$ and $R^2$ are identical or different, and each is a linear or branched alkyl group having from 1 to 20 carbon atoms, where appropriate with partial or complete halogen substitution, in particular fluorine substitution or an aryl group or aralkyl group having a linear or branched alkyl chain, preferably n-propyl, isopropyl, n-butyl, isobutyl, n-octyl, isooctyl, 1,1,2,2-tetrahydrotridecafluorooctyl, $R^3$ is a methyl, ethyl, n-propyl, isopropyl, n-butyl, isobutyl, or tert-butyl group, and a is 0, 1 or 2.

By way of example, particular mention may be made here of the following active silane ingredients:
n-propyltrimethoxysilane, n-propyltriethoxysilane, n-butyltrimethoxysilane,
n-butyltriethoxysilane, isobutyltrimethoxysilane, isobutyltriethoxysilane,
n-hexyltrimethoxysilane, n-hexyltriethoxysilane, isohexyltrimethoxysilane,
isohexyltriethoxysilane, n-octyltrimethoxysilane, n-octyltriethoxysilane,
isooctyltrimetboxysilane, isohexyltriethoxysilane, chloropropyltrimethoxysilane,
chloropropyltriethoxy-silane, 1,1,2,2-tetrahydrotridecafluorooctyltrimethoxy-silane, and 1,1,2,2-tetrahydrotridecafluorooctyltriethoxy-silane.

Of course, silane mixtures or partial hydrolyzates made from the silanes listed of formula I may also be used as active ingredient or impregnating agent in the process of the invention, as may mixtures of these with the monomeric oganosilanes. Siloxane mixtures, for example, as described in EP 0 814 110 and in EP 1 205 481, may also be used. Liquid fluorinated polymers, preferably having reactive groups which permit interaction with the substrate surface, may generally be used as oleophobic components, or else on their own, as may dissolved fluorinated polymers, fluorosilicones, or else triamino- and fluoroalkyl-functional organosiloxanes as described in EP 1 101 787. The above mentioned organosiloxanes have at least one triamino group of formula I:

wherein the group is bonded to at least one silicon atom via at least one N-bonded alkylene group having 1 to 4 C atoms, a and b are identical or different and are an integer ranging from 1 to 6, x is 0 or 1 or 2, y is 0 or 1, z is 0 or 1 or 2, with the proviso that (x+y+z)≦4, and at least one Si—C bonded fluoroalkyl group of formula II:

wherein r is 0 or an integer ranging from 1 to 18 and s is 0 or 2.

Methylsiloxanes or methylsilicone resins, for example, or appropriate mixtures of impregnating agents mentioned, may also be used as silicone impregnating agents in the present process.

In the process of the invention it is preferable to use impregnating agents in the viscosity range from 0.5 to 150,000 mPa·s, particularly preferably in the range from 0.65 to 1000 mPa·s, very particularly preferably in the viscosity range from 0.65 to 100 mPa·s. The active ingredients are preferably used undiluted and without solvent. However, if required, e.g. if the pure active ingredient is not available or not liquid or is too viscous, or during subsequent impregnation steps, they may also be used in solution or else as an aqueous emulsion.

Suitable substrates are generally any of the porous mineral substrates, particularly those which, in the dry state, can absorb more than 200 g/m², very particularly preferably more than 300 g/m², of water, the general method used to determine water absorbency being to weigh appropriate test specimens in a drying cabinet prior to conditioning, dip them into water once for 5 seconds, and determine the increase in weight.

The amount of impregnating agent preferably applied per spray pass according to the invention is 1 to 200 g/m², particularly preferably from 1 to 100 g/m², very particularly preferably from 5 to 75 g/m². During impregnation for hydrophobicization, one application pass is generally sufficient. However, the spray procedure of the invention may also be carried out two or more times in succession, preferably twice, three times, or four times, up to ten times in succession, or even more frequently. For example, antigraffiti coatings may, in particular if they use products as described in EP 1 101 787, require two or more spray passes or impregnating passes, and the following impregnation process here can follow the previous impregnation process before the previous impregnation has undergone drying (wet-on-wet). However, it is also possible to allow the previous impregnation to begin drying prior to the start of the next impregnation process. The sprayed substrate surfaces may readily be subjected to mechanical finishing, e.g. using a brush or a wiper, in order to render the distribution of liquid on the surface even more uniform. However, no finishing is usually necessary.

A particular difference between the process of the invention and the spray processes hitherto used for protection of buildings is that the use of a gas-supported spraying assembly results in an air flow with a high degree of orientation, with the result that fine droplets of impregnating agent are properly metered and substantially directed onto the substrate surface, i.e. there is no production here of an aerosol mist with all of its disadvantages, as generated by airless spray units using high pressure, and the high consumptions of product observed during operations in the process using airless technology at low pressure do not arise here.

Under certain conditions, therefore, the spray process of the invention has been found to provide particular advantages when executing impregnation processes, although this technique supplies very fine spray droplets and although the commonly held view is that fine spray mists should be eliminated when executing impregnation processes, such as the hydrophobicizing impregnation of construction materials with silane-, siloxane-, or silicone-based impregnating agents. For example, the use according to the invention of the LVLP or HVLP technique permits surprisingly uniform application of liquid impregnating agents, even when the amounts supplied are very low, below 60 g/m$^2$, to highly porous substrates, such as some natural stones, e.g. Savonnieres, Euville, etc., or to highly porous fiber-filled concrete panels and to mineral-fiber boards, as may be used in facade construction, for fire protection, or in the construction of horizontal or roofing surfaces. Despite very low consumptions of product, the effectiveness of the impregnations of the invention, in particular as shown by penetration depth and reduction in water absorption, or as shown by the function test for antigraffiti coatings, is surprisingly comparable, and indeed better, than that achieved using a conventional technique, such as the flow-coating process. In addition, the process of the invention provides capability for precise local application, with the result that no complicated and costly masking operations are needed, and there are practically no losses of product. The impregnating technique of the invention moreover permits the materials to be used in concentrates which are substantially free from solvent, in situations where a conventional technique would have to use solvent-diluted products or water-dilutable emulsions in the flow-coating process in order to permit control of consumption of active ingredient. The process of the invention therefore substantially permits solvents to be dispensed with, and likewise enables the use of complicated emulsifying technology to be avoided. The process of the invention therefore provides considerable environmental, toxicological, and also economic advantages for the protection of buildings.

The present invention is described in more detail by way of the following examples and comparative examples.

EXAMPLES

The test methods mentioned in the examples are conventional for the protection of buildings and are described in more detail below:

(1) Determination of Reduction in Water Absorption

The specification describes testing of the quality of hydrophobicization on mineral construction materials. The reduction in water absorption of the hydrophobicized specimen is determined by storing a hydrophobicized specimen under water and determining water absorption and comparing the water absorption with that of a reference specimen (untreated specimen).

To determine water absorption, the treated and untreated test specimens are stored in deionized water (underwater storage). For this, treated and untreated specimens are placed separately in tanks filled with deionized water. The water level should be about 1 cm above the test specimens.

After 24 hours of underwater storage, the increase in weight is determined accurately to 0.1 g by weighing. Prior to each weighing, water adhering to the surface is dabbed off using a cellulose material.

The following data relating both to the hydrophobicized test specimen and to the reference specimen are to be included in the test report:

1. Weight in g prior to storage in water
2. Weight in g after 24 hours of storage in water
3. Weight difference in g
4. Water absorption in abs. % (absolute %), based on initial weight of test specimen
5. Water absorption in rel. % (relative %), based on untreated specimens
6. Reduction in water absorption in %

(2) Determination of Penetration Depth

The method serves to determine the penetration depth of impregnating agents into mineral construction materials.

To determine penetration depth, the treated test specimens are broken into two parts, and each of the fracture surfaces is wetted with an aqueous colorant system. The non-impregnated zone becomes colored, whereas the impregnated zone remains colorless. The width of the treated surface as far as the color boundary is measured at eight different locations on the test specimen. In each case, the information is used to calculate an average value for penetration depth (in mm).

(3) The antigraffiti function test has been described in detail in Regelwert für die Bewertung von Verfahren, Technologien and Materialien zur Graffitientfemung and Graffitiprophylaxe (Set of regulations for the assessment of processes, technologies, and materials for graffiti removal and graffiti prevention)(ReGG) from the Gutegemeinschaft Antigraffiti, Copyright 2000 by Labor Dr. Kupfer, Alt Stralau 54, 10245 Berlin.

The test used in the examples is based on the above test specification and is carried out as follows:

| The test colorants used are: | |
|---|---|
| 1. Edding AG Ahrensburg | Edding 800 Permanent Marker black |
| 2. Dupli-Color | Acrylic coating, RAL 3000 flame red |
| 3. Hagebau (construction market) | Alkyd coating, spray coating, high-gloss, fuchsia pink |

-continued

The test colorants used are:

| | |
|---|---|
| 4. Toom (construction market) | Genius Pro aqua colored spray coating, high-gloss, gentian blue |
| 5. MZZE Hip Hop Mail-order | On The Run superfresh Color marker, blue |
| 6. MZZE Hip Hop Mail-order | Molotow XXL classic Ostergelb |
| 7. MZZE Hip Hop Mail-order | Molotow XXL Classic Chrom |
| 8. MZZE Hip Hop Mail-order | Molotow XXL Devil colors Pechschwarz |
| 9. MZZE Hip Hop Mail-order | Molotow XXL Classic Ultra-marinblau |
| 10. MZZE Hip Hop Mail-order | Covers All Bitumen combination, black |

Method:

The construction materials, e.g. concrete, sandstone, klinker, etc., are provided with graffiti protection. An essential factor in the specification is that, for comparison purposes, a zero specimen (construction material with no graffiti protection) is provided for each construction material used.

After an appropriate setting time, the colorants for the function test are applied. The colorants are left in the laboratory for 7 days at room temperature for drying.

The surface is cleaned using a cleaner (or cleaner system, as appropriate) which remains identical within the test. For this, the cleaning composition is applied and removed, using a high-pressure cleaner (50 bar, unheated) after about 15-20 minutes of exposure time. If color residues can still be seen on the substrate surface, this procedure is repeated a further time after from 2 to 3 hours of drying of the blocks (room temperature).

Assessment of Test Result:

The test result obtained is the visual assessment supported by photographic documentation of the success of cleaning.

The basis for visual assessment of result cleaning is as follows:

From 0 to 30% removal (no substantial removal of colorant): 1 point

From 30 to 75% removal (partial removal of colorant, colored outline clearly discernible): 2 points From 75 to 90% removal (majority of colorant removed, shadow discernible with outline): 3 points >90% removal (colorant effectively removed, vague shadow discernible with outline): 3 points All color removed (isolated color pigments in pores are permissible): 5 points Result of Function Test:

After cleaning, the Ci value is determined, using visual assessment of each individual color spot. This value is calculated as follows $$Ci \text{ value} = (\text{total spot count for individual color spots} \times 20)/(\text{Number of color spots}) \text{ Max. } Ci \text{ value} = 100$$

HVLP Spray Device:

The HVLP spray device used in the examples is a commercially available device from Fuji Industrial Spray Equipment Ltd., Toronto, Ontario, Canada, with the internal product definition "The Fuji Super System uses the Ametek-Lamb Electric 3-stage turbine motor type #116765". When executing the examples, use was made of a spray nozzle with diameter 1 mm. The compressor was operated with a supply rate of about 2850 l/min, using a gauge pressure of about 0.5 bar.

Example 1 (Comparative Example)

Hydrophobicization of fiber-filled concrete by dipping, using a solvent-free 100% system (isobutyltriethoxy-silane)

The impregnating agent in the form of an undiluted "100% system" is an isobutyltriethoxysilane with a commercially available purity of $\geq 98\%$ by weight.

The outer side of a facade panel from the company Plycem intended for outdoor use, made from fiber-filled concrete and having dimensions 10×15 cm (corresponding to 0.015 $m^2$), and thickness 11 mm, was dipped into a mixture made from 99% by weight of isobutyltriethoxysilane and 1% of tetrabutyl titanate (catalyst) in such a way as to give immersion of the panel to be impregnated into the liquid to a depth of about 1 mm. The amount of liquid absorbed was determined by weighing as 14.48 g (corresponding to about 965 g/$m^2$). After 2 weeks of storage time in the laboratory (reaction time), water absorption and penetration depth of the impregnating agent were determined, and comparison was made with an untreated panel.

The reduction in water absorption was 88%, and impregnation extended throughout the panel.

Example 2 (Comparative Example)

Hydrophobicization of fiber-filled concrete by dipping, using a silane system with 10% active ingredient content (10% of the impregnating solution from example 1 diluted in anhydrous ethanol).

The outer side of a facade panel from the company Plycem intended for outdoor use, made from fiber-filled concrete and having dimensions 10×15 cm (corresponding to 0.015 $m^2$), and thickness 11 mm, was dipped into a mixture made from 99% by weight of isobutyltriethoxysilane and of tetrabutyl titanate (catalyst) in such a way as to give immersion of the panel to be impregnated into the liquid to a depth of about 1 mm. The amount of liquid absorbed was determined by weighing as 15.1 g (corresponding to about 1007 g/$m^2$, corresponding to active ingredient consumption of about 100.7 g/$m^2$). After 2 weeks of storage time in the laboratory (reaction time), water absorption and penetration depth of the impregnating agent were determined, and comparison was made with an untreated panel.

The reduction in water absorption was about 81%, and the penetration depth exhibited by the panel for the impregnating agent was about 2 mm.

Example 3 (Comparative Example)

Hydrophobicization of fiber-filled concrete with a solvent-free 100% system (isobutyltriethoxysilane), using a simulated flow-coating process.

The outer side of a facade panel from the company Plycem intended for outdoor use, made from fiber-filled concrete and having dimensions 10×15 cm (corresponding to 0.015 $m^2$), and thickness 11 mm, was placed vertically. A pipette was then used to apply the impregnating agent from example 1 to the panel from above until a reflective film of liquid was produced on the surface. The amount of liquid absorbed was determined by weighing as 10.5 g (corresponding to about 700 g/$m^2$). The non-impregnated areas of the panel were then coated with a waterproof epoxy resin coating. After 2 weeks of storage time in the laboratory (reaction time), water absorption and penetration depth of the impregnating agent were determined, and comparison was made with an untreated panel.

The reduction in water absorption was 89%, and impregnation extended throughout the panel.

Example 4 (Comparative Example)

Hydrophobicization of fiber-filled concrete with a solvent-free 100% system (isobutyltriethoxysilane) by airless spraying.

A facade panel from the company Plycem intended for outdoor use, made from fiber-filled concrete and having dimensions 10×15 cm (corresponding to 0.015 m$^2$), and thickness 11 mm, was sprayed with the impregnating agent from example 1, using a spray apparatus (Gloria Floretta Kombi fine sprayer) corresponding to a Birchmeier spraying device, in such a way as to give a reflective liquid surface. Consumption of product was determined as 9.65 g (corresponding to about 643 g/m$^2$). After 2 weeks of storage time in the laboratory (reaction time), water absorption and penetration depth of the impregnating agent were determined, and comparison was made with an untreated panel.

The reduction in water absorption was 88%, and impregnation extended throughout the panel.

Example 5

Hydrophobicization of fiber-filled concrete with a solvent-free 100% system (isobutyltriethoxysilane), using an air-supported spraying technique.

A facade panel intended for outdoor use, made from fiber-filled concrete and having dimensions 10×15 cm (corresponding to 0.015 m$^2$), and thickness 11 mm, was sprayed once with the impregnating agent (isobutyltriethoxysilane) from example 1, using an HVLP device. Consumption of product was adjusted at the fine-regulation valve in such a way that the panel had absorbed about 0.71 g of the impregnating agent, corresponding to product consumption of only about 47 g/m$^2$. After 2 weeks of storage time in the laboratory (reaction time), water absorption and penetration depth of the impregnating agent were determined, and comparison was made with an untreated panel.

The reduction in water absorption was about 90%, and the penetration depth for the panel was about 2 mm.

Example 5a

Hydrophobicization of fiber-filled concrete with an organosiloxane-containing 100% system, using an air-supported spray technique.

A facade panel from the company Plycem intended for outdoor use, made from fiber-filled concrete and having dimensions 10×15 cm (corresponding to 0.015 m$^2$), and thickness 11 mm, was sprayed with an impregnating agent of the following composition, using an HVLP device:

98% by weight of propylethoxysiloxane corresponding to EP 1 205 481 as in example 1, 1% of dibutyltin dilaurate (catalyst), and 1% of Aerosil R202 (droplet run-off promoter).

Consumption of product was adjusted at the fine-regulation valve in such a way that the panel had absorbed about 0.71 g of the impregnating agent, corresponding to product consumption of only about 74 g/m$^2$. After 2 weeks of storage time in the laboratory (reaction time), water absorption and penetration depth of the impregnating agent were determined, and comparison was made with an untreated panel.

The reduction in water absorption was about 91%, and the penetration depth for the panel was about 2 mm.

Example 6

Application of an antigraffiti impregnating agent by an air-supported spray technique in a multistep process.

A concrete block (composite paving block to DIN 18 503) was impregnated with an antigraffiti solution described in EP 1 101 787 as in example 1, which is a water soluble condensate of N-[N'-(2-aminoethyl)-2-aminoethyl]-3-aminopropyl-trimethoxysilane and tridecafluoro-1,1,2,2-tetrahydrooctylt-rimethoxy-silane, using an HVLP spray device, in such a way as to give product consumption of about 150 g/m$^2$. The surface of the block dried in the laboratory within about 2 hours. The next impregnation was then applied to the dry surface, using an HVLP device, in such a way as to give product consumption of 65 g/m$^2$. After one hour of waiting time, the surface of the block was dry, and the next impregnation was applied with product consumption of about 40 g/m$^2$. The total consumption of product was therefore about 255 g/m$^2$, and the total application time was about 3 hours. After one week of waiting time, an antigraffiti function test was carried out. For this the block, in accordance with the abovementioned standard, was treated with colorants and then cleaned, using a commercially available graffiti cleaner (Krautol Uniabbeizer). Bitumen paint was removed using Durrotech Graffiti-Clean 25 bitumen cleaner. The effectiveness of the impregnation was excellent. A Ci value of 100 was achieved.

Example 7 (Comparative Example)

Application of an antigraffiti impregnating agent by a multistep combination process: flow-coating process/airless spraying process.

A concrete block (composite paving block to DIN 18 503) was treated, by a flow-coating process, with an antigraffiti solution, described in EP 1 101 787 as in example 1, which was diluted in advance in the ratio 1 part of antigraffiti solution +14 parts of water. The resultant product consumption was about 415 g/m$^2$ (corresponding to 28 g of antigraffiti concentrate). The surface of the block dried in the laboratory within about 4 hours. The next impregnation was then applied to the dried surface, using undiluted antigraffiti agent, and using a spray device (Gloria Floretta Kombi fine sprayer) corresponding to a Birchmeier spray, in such a way as to give product consumption of 200 g/m$^2$. In order to achieve a uniform film of liquid, the product applied by spraying had to be worked into the surface, using a brush. After two hours of waiting time the surface of the block was dry, and the next impregnation was applied with product consumption of about 163 g/m$^2$. Again, it was necessary to work the material in, using a brush. In order to achieve the same performance as in example 6 in the antigraffiti function test, a further impregnation pass was necessary after 2 hours of waiting time, with product consumption of 133 g/m$^2$. The total consumption of product was therefore about 524 g/m$^2$, and the total time for the application was about 8.5 hours. After one week of waiting time, an antigraffiti function test was carried out. For this the block, in accordance with the abovementioned standard, was treated with colorants and then cleaned, using a commercially available graffiti cleaner (Krautol Uniabbeizer/Durrotech Graffiti-Clean 25 bitumen cleaner). The effectiveness of the impregnation was excellent. A Ci value of 100 was achieved.

The disclosure of the priority document, German patent application no. 102 18 871.8, filed on Apr. 26, 2002, is incorporated by reference herein in its entirety.

What is claimed is:

1. A process comprising impregnating a porous mineral substrate with a liquid impregnating agent, wherein
the impregnating comprises spraying the liquid impregnating agent and a gas from a gas-supported spraying assembly; and
the liquid impregnating agent is sprayed from the gas-supported spraying assembly at a pressure of at most 2 bar gauge, wherein
the gas-supported spraying assembly comprises a nozzle system comprising one or more nozzles;
the liquid impregnating agent and the gas are fed into each of the one or more nozzles at a pressure of at most 2 bar gauge; and
the gas atomizes the liquid impregnating agent in each of the one or more nozzles, wherein the liquid impregnating agent is substantially free of solvent.

2. The process as claimed in claim 1, wherein the gas comprises air.

3. The process as claimed in claim 1, wherein the gas-supported spraying assembly further comprises
a gas-compression unit;
a storage unit for storing the liquid impregnating agent;
a connection from the gas-compression unit to the nozzle system for conveying the gas to the nozzle system; and
a connection from the storage unit to the nozzle system for supplying the liquid impregnating agent to the nozzle system.

4. The process as claimed in claim 3, wherein the gas-supported spraying assembly further comprises, attached to the gas-compression unit, a gas regulating unit to control a pressure or an amount of the gas conveyed to the nozzle system.

5. The process as claimed in claim 4, wherein the gas regulating unit comprises a regulating valve.

6. The process as claimed in claim 3, wherein the gas-supported spraying assembly further comprises, attached to the storage unit, a liquid regulating unit to control an amount of the liquid impregnating agent supplied to the nozzle system.

7. The process as claimed in claim 6, wherein the liquid regulating unit comprises a regulating valve.

8. The process as claimed in claim 3, wherein the one or more nozzles each has a diameter of at most 4 mm.

9. The process as claimed in claim 3, wherein the gas comprises air.

10. The process as claimed in claim 9, wherein the spraying comprises feeding the air and the liquid impregnating agent into the nozzle system to generate a spray jet.

11. The process as claimed in claim 9, wherein the gas-compression unit generates a constant supply of compressed air.

12. The process as claimed in claim 9, wherein the gas-compression unit generates a variable supply of compressed air.

13. The process as claimed in claim 9, wherein the gas-compression unit generates an air supply, at room temperature and atmospheric pressure, of at least 100 l/min.

14. The process as claimed in claim 9, wherein the gas-compression unit generates an air supply, at room temperature and atmospheric pressure, of at least 100 l/min from each of the one or more nozzles.

15. The process as claimed in claim 3, wherein the spraying comprises guiding the nozzle system automatically over the porous mineral substrate.

16. The process as claimed in claim 1, wherein the liquid impregnating agent comprises at least one of a hydrophobicizing agent and an oleophobicizing agent.

17. The process as claimed in claim 1, wherein the liquid impregnating agent comprises at least one organosilicon compound.

18. The process as claimed in claim 17, wherein the at least one organosilicon compound comprises at least one monomeric silane of the general formula I $$R^1-Si(R^2)_a(OR^3)_{3-a} \quad (I),$$

where
$R^1$ and $R^2$ are identical or different, and each is
a linear or branched alkyl group having from 1 to 20 carbon atoms, optionally with partial or complete halogen substitution,
an aryl group, or
an aralkyl group having a linear or branched alkyl chain;
$R^3$ is a methyl, ethyl, n-propyl, isopropyl, n-butyl, isobutyl, or tert-butyl group; and
$a$ is 0, 1 or 2.

19. The process as claimed in claim 18, wherein the organosilicon compound comprises one or more selected from the group consisting of n-propyltrimethoxysilane, n-propyltriethoxysilane, n-butyltrimethoxysilane, n-butyltriethoxysilane, isobutyltrimethoxysilane, isobutyltriethoxysilane, n-hexyltrimethoxysilane, n-hexyltriethoxysilane, isohexyltrimethoxysilane, isohexyltriethoxysilane, n-octyltrimethoxysilane, n-octyltriethoxysilane, isooctyltrimethoxysilane, isooctyltriethoxysilane, chloropropyltrimethoxy-silane, chloropropyltriethoxysilane, 1,1,2,2-tetrahydrotridecafluorooctyltrimethoxy-silane, and 1,1,2,2-tetrahydrotridecafluorooctyl-triethoxysilane.

20. The process as claimed in claim 17, wherein the at least one organosilicon compound comprises at least one siloxane produced by a process comprising hydrolysis and condensation of at least one monomeric silane of the general formula I $$R^1-Si(R^2)_a(OR^3)_{3-a} \quad (I),$$

where
$R^1$ and $R^2$ are identical or different, and each is
a linear or branched alkyl group having from 1 to 20 carbon atoms, optionally with partial or complete halogen substitution,
an aryl group, or
an aralkyl group having a linear or branched alkyl chain;
$R^3$ is a methyl, ethyl, n-propyl, isopropyl, n-butyl, isobutyl, or tert-butyl group; and
$a$ is 0, 1 or 2.

21. The process as claimed in claim 17, wherein the at least one organosilicon compound comprises at least one selected from the group consisting of silanes, siloxanes and silicones.

22. The process as claimed in claim 17, wherein the at least one organosilicon compound comprises at least one selected from the group consisting of silanes and siloxanes.

23. The process as claimed in claim 17, wherein the at least one organosilicon compound comprises a silicone.

24. The process as claimed in claim 17, wherein the at least one organosilicon compound comprises at least one of a siloxane and a monomeric silane of the general formula I $$R^1-Si(R^2)_a(OR^3)_{3-a} \quad (I),$$

where
R¹ and R² are identical or different, and each is
a linear or branched alkyl group having from 1 to 20 carbon atoms, optionally with partial or complete halogen substitution,
an aryl group, or
an aralkyl group having a linear or branched alkyl chain;
R³ is a methyl, ethyl, n-propyl, isopropyl, n-butyl, isobutyl, or tert-butyl group; and
a is 0, 1 or 2.

25. The process as claimed in claim 17, wherein the at least one organosilicon compound comprises an antigraffiti impregnating agent.

26. The process as claimed in claim 25, wherein the antigraffiti impregnating agent comprises at least one fluoropolymer.

27. The process as claimed in claim 26, wherein the at least one fluoropolymer comprises reactive groups capable of bonding with the porous mineral substrate.

28. The process as claimed in claim 1, wherein the porous mineral substrate is selected from the group consisting of fiber-filled concrete, concrete, sandstone, limestone, natural stone, glass wool items, mineral wool items, bricks, artificial stone, mortar, render, terracotta, ceramic, calcium silicate brick, cement-bound construction materials and clay-bound construction materials.

29. The process as claimed in claim 1, wherein the porous mineral substrate, when dried and then immersed in water for 5 seconds, absorbs more than 200 g of water per square meter of the porous mineral substrate.

30. The process as claimed in claim 1, wherein the impregnating comprises spraying the liquid impregnating agent on the porous mineral substrate in one or more application passes.

31. The process as claimed in claim 30, wherein 1 to 200 g of the liquid impregnating agent per square meter of the porous mineral substrate is sprayed on the porous mineral substrate in each application pass.

32. The process as claimed in claim 1, wherein the impregnating comprises
spraying on the porous mineral substrate in a first application pass 10 to 300 g of the liquid impregnating agent per square meter of the porous mineral substrate; and
then spraying on the porous mineral substrate in each subsequent application pass 1 to 150 g of the liquid impregnating agent per square meter of the porous mineral substrate.

33. The process as claimed in claim 1, wherein the impregnating comprises
spraying on the porous mineral substrate in a first application pass 10 to 200 g of the liquid impregnating agent per square meter of the porous mineral substrate; and
then spraying on the porous mineral substrate in each subsequent application pass 1 to 100 g of the liquid impregnating agent per square meter of the porous mineral substrate.

34. The process as claimed in claim 30, wherein
the one or more application passes comprises a first application pass and a subsequent second application pass; and
during the second application pass the porous mineral substrate is wet with the liquid impregnating agent sprayed in the first application pass.

35. The process as claimed in claim 30, further comprising, after each of the one or more application passes, drying the porous mineral substrate.

36. The process as claimed in claim 1, wherein the porous mineral substrate is part of a building.

37. The process as shown in claim 25, wherein the antigraffiti impregnating agent comprises at least one triamino- and fluoroalkyl-functional organosiloxane.

38. The process as claimed in claim 37, wherein the organosiloxane has at least one

$$[NH_x(CH_2)_a NH_y(CH_2)_b NH_z]- \quad (I)$$

wherein the group is bonded to at least one silicon atom via at least one N-bonded alkylene group having 1 to 4 C atoms, a and b are identical or different and are an integer ranging from 1 to 6, x is 0 or 1 or 2, y is 0 or 1, z is 0 or 1 or 2, with the proviso that $(x+y+z)\leq 4$, and at least one Si—C bonded fluoroalkyl group of formula II:

$$F_3C(CF_2)_r(CH_2)_s- \quad (II)$$

wherein r is 0 or an integer ranging from 1 to 18 and s is 0 or 2.

39. The process as claimed in claim 37, wherein the organosiloxane is a condensate of N-[N'-(2-aminoethyl)-2-aminoethyl]-3-aminopropyltrimethoxysilane and tridecafluoro-1,1,2,2-tetrahydrooctyltriethoxy-silane.

40. The process as claimed in claim 1, wherein the nozzle system comprises two or more nozzles.

* * * * *